(12) United States Patent
Kanagasabapathy et al.

(10) Patent No.: US 8,338,351 B2
(45) Date of Patent: Dec. 25, 2012

(54) COATING COMPOSITIONS FOR PRODUCING TRANSPARENT SUPER-HYDROPHOBIC SURFACES

(75) Inventors: Subbareddy Kanagasabapathy, Lexington, KY (US); Richard J. Baumgart, Paris, KY (US); Wen-Chen Su, Lexington, KY (US); Frances E. Lockwood, Georgetown, KY (US); Vinod Kanniah, Lexington, KY (US)

(73) Assignee: Ashland Licensing and Intellectual Property, LLC, Dublin, OH (US)

( * ) Notice: Subject to any disclaimer, the term of this patent is extended or adjusted under 35 U.S.C. 154(b) by 0 days.

(21) Appl. No.: 13/074,242

(22) Filed: Mar. 29, 2011

(65) Prior Publication Data

US 2011/0177252 A1   Jul. 21, 2011

Related U.S. Application Data

(63) Continuation of application No. 11/897,978, filed on Aug. 31, 2007, now abandoned, which is a continuation-in-part of application No. 11/699,883, filed on Jan. 30, 2007, now abandoned.

(60) Provisional application No. 60/841,720, filed on Aug. 31, 2006, provisional application No. 60/931,545, filed on May 24, 2007, provisional application No. 60/763,294, filed on Jan. 30, 2006.

(51) Int. Cl.
  *C11D 9/36* (2006.01)

(52) U.S. Cl. ........ 510/189; 523/169; 525/477; 525/478; 428/405; 428/447; 524/261; 524/262; 524/263; 524/267; 528/10; 528/31; 427/387

(58) Field of Classification Search ............ 523/169; 525/477, 488; 428/405, 447; 524/261, 262, 524/263, 267; 528/10, 31; 427/387
See application file for complete search history.

(56) References Cited

U.S. PATENT DOCUMENTS

| | | | |
|---|---|---|---|
| 3,354,022 A | 11/1967 | Dettre et al. | |
| 4,275,118 A | 6/1981 | Baney et al. | |
| 4,652,618 A * | 3/1987 | Sumida et al. | 525/478 |
| 4,778,624 A * | 10/1988 | Ohashi et al. | 516/67 |
| 4,900,774 A | 2/1990 | Mitsuji et al. | |
| 5,106,922 A * | 4/1992 | Saito et al. | 525/477 |
| 5,130,167 A | 7/1992 | Mitsuji et al. | |
| 5,141,915 A | 8/1992 | Roenigk et al. | |
| 5,212,241 A | 5/1993 | Woo et al. | |
| 5,269,958 A | 12/1993 | de Jager | |
| 5,432,000 A | 7/1995 | Young, Sr. et al. | |
| 5,488,081 A | 1/1996 | Halladay | |
| 5,520,956 A | 5/1996 | Kieser et al. | |
| 5,576,360 A | 11/1996 | Craun et al. | |
| 5,599,489 A | 2/1997 | Saiki et al. | |
| 5,633,314 A | 5/1997 | Jamasbi | |
| 5,643,555 A * | 7/1997 | Collin et al. | 424/59 |
| 5,705,558 A | 1/1998 | Krouse | |
| 5,928,729 A * | 7/1999 | Derosa | 427/387 |
| 5,929,159 A | 7/1999 | Schutt et al. | |
| 6,020,419 A | 2/2000 | Bock et al. | |
| 6,099,971 A * | 8/2000 | Faris et al. | 428/447 |
| 6,150,318 A | 11/2000 | Silvester et al. | |
| 6,153,689 A * | 11/2000 | Itoh et al. | 524/588 |
| 6,201,051 B1 | 3/2001 | Mager et al. | |
| 6,264,859 B1 | 7/2001 | Basil et al. | |
| 6,355,189 B1 | 3/2002 | Basil et al. | |
| 6,491,979 B1 * | 12/2002 | Yamaguchi et al. | 427/385.5 |
| 6,586,104 B2 | 7/2003 | Matsuda et al. | |
| 6,599,973 B1 | 7/2003 | Visscher et al. | |
| 6,652,975 B2 * | 11/2003 | Kuck et al. | 428/447 |
| 6,660,363 B1 | 12/2003 | Barthlott | |
| 6,683,126 B2 | 1/2004 | Keller et al. | |
| 6,723,438 B2 | 4/2004 | Chang et al. | |
| 6,800,354 B2 | 10/2004 | Baumann et al. | |
| 6,811,856 B2 | 11/2004 | Nun et al. | |
| 6,822,040 B2 | 11/2004 | Baugh et al. | |
| 6,846,512 B2 | 1/2005 | Rohrbaugh et al. | |
| 6,852,389 B2 | 2/2005 | Nun et al. | |
| 6,858,284 B2 | 2/2005 | Nun et al. | |
| 6,977,094 B2 | 12/2005 | Oles et al. | |
| 7,066,998 B2 | 6/2006 | Rohrbaugh et al. | |
| 7,094,741 B2 | 8/2006 | Barnabas et al. | |
| 7,183,354 B2 | 2/2007 | Halladay et al. | |
| 7,196,043 B2 | 3/2007 | Valpey, III et al. | |
| 7,297,731 B2 | 11/2007 | Walker, Jr. et al. | |
| 2001/0037876 A1 | 11/2001 | Oost et al. | |
| 2002/0011182 A1 | 1/2002 | Matsuda et al. | |
| 2002/0016433 A1 | 2/2002 | Keller et al. | |
| 2002/0045010 A1 | 4/2002 | Rohrbaugh et al. | |
| 2002/0090739 A1 * | 7/2002 | Laguitton | 436/518 |
| 2002/0150723 A1 | 10/2002 | Oles et al. | |

(Continued)

FOREIGN PATENT DOCUMENTS

CH        268258 A        8/1950

(Continued)

OTHER PUBLICATIONS

U.S. Patent and Trademark Office, Office Action in related U.S. Appl. No. 11/699,883, dated Nov. 17, 2008, 8 pp.

(Continued)

*Primary Examiner* — Charles Boyer
(74) *Attorney, Agent, or Firm* — Wood, Herron & Evans, LLP

(57) ABSTRACT

A coating composition and process for generating transparent, near-transparent, and semi-transparent super-hydrophobic coatings on surfaces having a contact angle of greater than 165 degrees. The composition comprises hydrophobic nanoparticles of silsesquioxanes containing adhesion promoter groups and low surface energy groups.

6 Claims, 2 Drawing Sheets

U.S. PATENT DOCUMENTS

| | | | |
|---|---|---|---|
| 2002/0150724 A1 | 10/2002 | Nun et al. | |
| 2002/0150725 A1 | 10/2002 | Nun et al. | |
| 2002/0150726 A1 | 10/2002 | Nun et al. | |
| 2002/0150765 A1 | 10/2002 | Chang et al. | |
| 2003/0050388 A1 | 3/2003 | Strickland et al. | |
| 2003/0068486 A1 | 4/2003 | Arney et al. | |
| 2003/0080458 A1* | 5/2003 | Heilig et al. | 264/130 |
| 2003/0114571 A1 | 6/2003 | Pan | |
| 2003/0152785 A1* | 8/2003 | Sanders et al. | 428/447 |
| 2003/0171476 A1* | 9/2003 | Li et al. | 524/492 |
| 2004/0047997 A1 | 3/2004 | Keller et al. | |
| 2004/0071986 A1* | 4/2004 | Shoshi et al. | 428/446 |
| 2004/0127393 A1 | 7/2004 | Valpey et al. | |
| 2004/0154106 A1 | 8/2004 | Oles et al. | |
| 2004/0213904 A1 | 10/2004 | Muller et al. | |
| 2005/0009953 A1* | 1/2005 | Shea | 523/169 |
| 2005/0009982 A1 | 1/2005 | Inagaki et al. | |
| 2005/0065242 A1 | 3/2005 | McGee et al. | |
| 2005/0103457 A1 | 5/2005 | Nun et al. | |
| 2005/0116347 A1* | 6/2005 | Hacker | 257/758 |
| 2005/0118433 A1 | 6/2005 | Oles et al. | |
| 2005/0136217 A1 | 6/2005 | Barthlott et al. | |
| 2005/0153077 A1 | 7/2005 | Gedeon et al. | |
| 2005/0186412 A1 | 8/2005 | Arora | |
| 2005/0205830 A1 | 9/2005 | Oles et al. | |
| 2005/0208269 A1 | 9/2005 | Nun et al. | |
| 2005/0221107 A1 | 10/2005 | Miyai et al. | |
| 2005/0267256 A1 | 12/2005 | Nakamoto | |
| 2005/0282953 A1 | 12/2005 | Simendinger et al. | |
| 2006/0058436 A1* | 3/2006 | Kasler | 524/261 |
| 2006/0110541 A1 | 5/2006 | Russell et al. | |
| 2006/0110542 A1 | 5/2006 | Dietz et al. | |
| 2006/0110612 A1* | 5/2006 | Simendinger et al. | 428/447 |
| 2006/0178463 A1 | 8/2006 | Sacks | |
| 2007/0027232 A1 | 2/2007 | Walsh et al. | |
| 2007/0281098 A1* | 12/2007 | Hirayama et al. | 427/387 |

FOREIGN PATENT DOCUMENTS

| | | |
|---|---|---|
| DE | 1022246 | 1/1958 |
| DE | 19917367 A1 | 10/2000 |
| EP | 0217385 A2 | 4/1987 |
| EP | 0369581 A1 | 5/1990 |
| EP | 1040874 A2 | 10/2000 |
| EP | 1479738 A1 | 11/2004 |
| FR | 2150474 A1 | 4/1973 |
| GB | 1335957 A | 10/1973 |
| GB | 2223761 A | 4/1990 |
| GB | 2231876 A | 11/1990 |
| GB | 2311527 A | 10/1997 |
| GB | 2421727 A | 7/2006 |
| WO | 9404123 | 3/1994 |
| WO | 9936481 | 7/1999 |
| WO | 0039239 | 7/2000 |
| WO | 0058410 | 10/2000 |
| WO | 0071834 | 11/2000 |
| WO | 0196511 | 12/2001 |
| WO | 03022935 | 3/2003 |
| WO | 2007128636 A2 | 11/2007 |

OTHER PUBLICATIONS

U.S. Patent and Trademark Office, Office Action in related U.S. Appl. No. 12/011,566 dated Nov. 18, 2008, 8 pp.

International Searching Authority, International Search Report and Written Opinion, International Application No. PCT/US08/75353, mailed Nov. 5, 2008, 14 pp.

International Searching Authority, International Search Report and Written Opinion, International Application No. PCT/US08/06443, mailed Nov. 19, 2008, 7 pp.

Pilotek et al., "Wettability of Microstructured Hydrophobic Sol-Gel Coatings," Journal of Sol-Gel Science and Technology, vol. 26, Jan. 2003, pp. 789-792.

U.S. Patent and Trademark Office, Final Office Action, from related Application U.S. Appl. No. 11/699,883, dated Aug. 20, 2009, 10 pp.

* cited by examiner

COATING COMPOSITIONS FOR PRODUCING TRANSPARENT SUPER-HYDROPHOBIC SURFACES

CROSS REFERENCE TO RELATED APPLICATIONS

This application is a Continuation of U.S. application Ser. No. 11/897,978 filed on Aug. 31, 2007, which claims priority from U.S. Provisional Application Ser. No. 60/841,720 filed on Aug. 31, 2006; U.S. Provisional Application Ser. No. 60/931,545 filed on May 24, 2007; and U.S. application Ser. No. 11/699,883 filed on Jan. 30, 2007, which claims priority from U.S. Provisional Application Ser. No. 60/763,294 filed on Jan. 30, 2006, all of which are incorporated by reference herein in their entireties.

TECHNICAL FIELD

The technical field of this invention is producing super hydrophobic coatings on surfaces.

BACKGROUND OF THE INVENTION

The invention relates to protection of various surfaces from contaminants and from oxidation of surfaces in air and moisture. One of the primary applications includes the use of this technology in vehicle appearance products. Although, products for similar applications are widely available on the market, these products often require rinsing with water after use and usually rely on a temporary hydrophilic surface. Typically when the water dries from the surface, water marks, smears or spots are left behind due to the deposits of minerals which were present as dissolved solids in water. This problem is apparent when cleaning glass, painted surfaces, steel, alloy, plastic or ceramic surfaces. A means of solving this problem known in the literature is to dry the water from the surface using a cloth or chamois before the water marks form. However, this drying process is time consuming and requires considerable physical efforts.

DESCRIPTION OF THE PRIOR ART

There are several published articles which address the elimination of water marks. In one example, U.S. Pat. No. 5,759,980, a composition, comprises a surfactant package consisting of a silicone-based surfactant and a polymer which is capable of bonding to a surface to make a hydrophilic film which eliminates the problem of water marks. However, this hydrophilic coating may tend to be removed from the surface by a single water rinse. German publication DE-A21 61 591 also describes a composition for cleaning cars wherein the surface is again made hydrophilic by using amino functional polymers. This coating also tends to be rinsed off from a single rinse. In another example, PCT WO97/48927 teaches a direct method of a cleaning composition, method of application and apparatus. This reference describes using a spray gun comprising separate chambers for the cleaning solution and ion exchange resin. Moreover, it recommends to use purified rinse water which is expensive to use. There are number of waxes and other products available in the market for attempting to retain this spot free finish. Typically these products are designed to hydrophobically modify the surfaces after waxing so that the water will bead up on the hydrophobic surface. However, the hydrophobicity of the surfaces is not sufficient enough to bead the water completely from the surface thereby leaving the water spot when the water dries.

Therefore, there is a need to develop a process and coating for protecting various surfaces from the appearance of water marks, corrosion, and dirt repellency, while maintaining the water repellency even after several water rinses.

SUMMARY OF THE INVENTION

The present invention provides a coating composition and process for generating transparent, near-transparent, and semi-transparent super-hydrophobic coatings on surfaces having a contact angle of greater than 165 degrees. One preferred composition comprises hydrophobic nanoparticles of silsesquioxanes containing adhesion promoter groups and low surface energy groups such as materials that contain fluoroalkyl groups, which reduce the surface energy due to its small atomic radius and high electronegativity forming a stable covalent bond with carbon.

The silsesquioxane based composition provides a coating composition for generating transparent super-hydrophobic surfaces, comprising silsesquioxanes with i) an adhesion promoter, ii) low surface energy groups and to a process for producing such surfaces. The coating utilizes hydrophobic nanoparticles of silsesquioxanes in a solvent.

The super hydrophobic coating composition that can be used to make wet and dry dirt repellent surfaces to keep the surfaces clean for a reasonable period of time. The coating may utilize hydrophobic nanoparticles of silsesquioxanes in a solvent with an adhesion promoter. More particularly, the particle may be silicon based including, for example, silica, silicates and polysilsesquioxane. A nanocomposite structure may be formed by casting, depositing or forming the material including nanocomposite particles.

The coating solves the problem of poor resistance to UV light and/or abrasion found in previous coatings of similar nature. The transparent, near transparent, or semi-transparent coatings can be produced using the current invention whereas previous coatings of comparable hydrophobicity have all been white or opaque. The coating can be applied by a single and easy spraying method and the super hydrophobic property can be achieved by drying the film at room temperature for 5 to 10 minutes. A preferred coating has good resistance to UV light and some resistance to abrasion.

The present invention relates to a process and composition for creating super hydrophobic coatings (contact angle >165 degree) on various surfaces, preferably plastics, woods, metals, glass, ceramics, and painted and/or waxed surfaces. Super hydrophobic coatings of this type have recently been cited for the purpose of keeping surfaces cleaner, similar to the lotus plant, and the high contact angle is known as the "lotus effect." Examples of commercially available materials which attempt to produce this "Lotus" cleaning effect are products sold under the trade name of MINCOR available from BASF, and TEGTOP available from Degussa. These products have been tested for their ability to protect various surfaces from the appearance of water marks, corrosion, and dirt repellency and while maintaining the water repellency, but were deemed unsuitable. When coated alone or mixed with various types of hydrophobic particles, these and many other polymers, e.g. acrylic resins, silicon containing graft copolymers, homopolymers, methyl methacrylate, copolymers of acrylic monomers, styrene monomers, styrene copolymers, functional/non functional siloxanes, inorganic hybrids such as silsesquioxanes, acrylic polymers containing perfluoro pendant groups, TEFLON/nafion type fluoro polymers, urethanes, fluorourethanes, polyethers, polyesters and silicon modified polyacrylates, it was found that the resulting coating is initially super hydrophobic and may remain so for long periods indoors; however, when exposed to outdoor UV light, rubbed even slightly, or in general exposed to weather, the coating loses super hydrophobicity (which we define as the instant shedding of water with no remaining drops) becomes less hydrophobic within days or even hydrophilic and hence less useful for the object of the present invention. Examination under the microscope after a week of exposure on a panel in a UV cabinet reveals that a coating made from fumed silica and at least one film forming binder as taught in U.S. Pat. No. 6,683,126 disintegrates over time. Furthermore it has been published in a General Motors reference, (GM reference), that lotus type coatings, when exposed to steam, lose their hydrophobicity. No practical lotus coatings exist for the object of this invention.

The invention described herein provides a long lasting super hydrophobic coating that has the benefit of self cleaning of various surfaces and will reduce icing caused by water drops. However it should be noted that snow will cover horizontal surfaces but can be more easily removed from the surfaces protected with the coating formed from the composition of the present invention. Furthermore, the coatings of the instant invention are inexpensive compared to paint and can be sprayed regularly if necessary to keep the surface clean without any further steps.

The static contact angle of a drop of liquid can be used to measure the wettability of surfaces. The static contact angle can be defined as the angle enclosed by the surface and a tangent along the surface of the liquid drop in the region of the contact point of the liquid drop with the surface. The contact angle is measured through the liquid drop. A contact angle of 0 defines complete wettability and does not form a drop. A contact angle of 180 degrees defines complete unwettability.

The hydrophobic self-cleaning coating composition forms a dirt repellant film on a clear, translucent, or painted metal, wood, glass, or polymer substrate, comprising an effective amount of a silsesquioxanes in a solvent and combined with an adhesion promoter imparts a degree of hydrophobicity at ambient temperature to a coated surface providing a wetting surface having a contact angle of at least 165 degrees as compared to water having a contact angle of from 80 to 90 degrees on a noncoated surface and said composition imparting a degree of hydrophobicity to a coated surface providing a wetting surface having a tilt angle of sliding of less than 2 degrees as compared to water having a tilt angle of sliding of 90 degrees on a noncoated surface.

In one preferred embodiment, the hydrophobic self-cleaning coating composition forms a temporary dirt repellant film or coating on a clear, translucent, or painted metal, wood, glass, or polymer substrate, comprising an effective amount of a degree of hydrophobicity to a coated surface providing a wetting surface having a contact angle of at least 165 degrees as compared to water having a contact angle of from 80 to 90 degrees on a noncoated surface and said composition imparting a degree of hydrophobicity to a coated surface providing a wetting surface having a tilt angle of sliding of less than 2 degrees as compared to water having a tilt angle of sliding of 90 degrees on a noncoated surface.

The preferred embodiment utilizes organopolysiloxanes having an atomic ratio of oxygen to silicon of 1.5 are generally called polysilsesquioxanes. Polysilsesquioxanes have a ladder-like structure as shown in FIG. 1, wherein R is the same or different and is lower alkyl, phenyl, substituted phenyl, phenethyl and methylphenethyl, with at least one of the groups represented by R being lower alkyl, and n is an integer.

It is an object of the present invention to provide a super hydrophobic coating, which is so hydrophobic that water will bounce off the surface of nominally horizontal coated plates. In this case the contact angle is so large (greater than 165 degree) that it cannot be measured by conventional instrumentation.

Another object of the present invention is to provide coatings that are practical in use, that do not degrade rapidly in sunlight, that can be readily applied, and have enough resistance to abrasion to survive for a practical length of time, at least between vehicle washes, and preferably for weeks or months depending upon environmental conditions to which the coating is exposed.

Another object of the present invention is to provide a process for applying such coatings.

Another object of the present invention is to use "lotus" coatings for a different purpose, to reduce drag.

In the instant invention, compositions are provided having a small amount of nanoparticles of silsesquioxanes with an adhesion promoter or other hydrophobic nanoparticle component with good UV light stability and good adhesion to metals, wood, glass, plastic, painted and many other surfaces. The composition does not comprise any binding materials as taught in the prior art. The nanoparticle containing compositions can be sprayed in a broad range of solid mixtures using VOC complaint solvents with aerosol propellants. The final uniform coating is obtained by drying the film at room temperature for 5 to 10 minutes.

Although a variety of nanoparticles will work if coated with a hydrophobic material, e.g. silsesquioxanes, perfluoroacrylic resins etc. only a few polymers serve as an adequate base for the particles because the surface area of exposed polymer is vastly increased due to very thin film and rough surface area produced by the coating. This problem was either not understood or not solved in the prior art references. Formulation of the coating to resist abrasion and the elements, particularly UV light is an object of this invention. UV stability of the super hydrophobic coatings is extremely important especially for exterior surfaces which are exposed to UV light.

Selection of the nanoparticle enables the formulation of a composition without any binder which will produce a practical lotus effect that is not easily destroyed by fog, UV light, or abrasion, e.g. by flowing water.

Other objects, features, and advantages of the invention will be apparent with the following detailed description taken in conjunction with the accompanying drawings showing a preferred embodiment of the invention and appended claims.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

Figure 1:
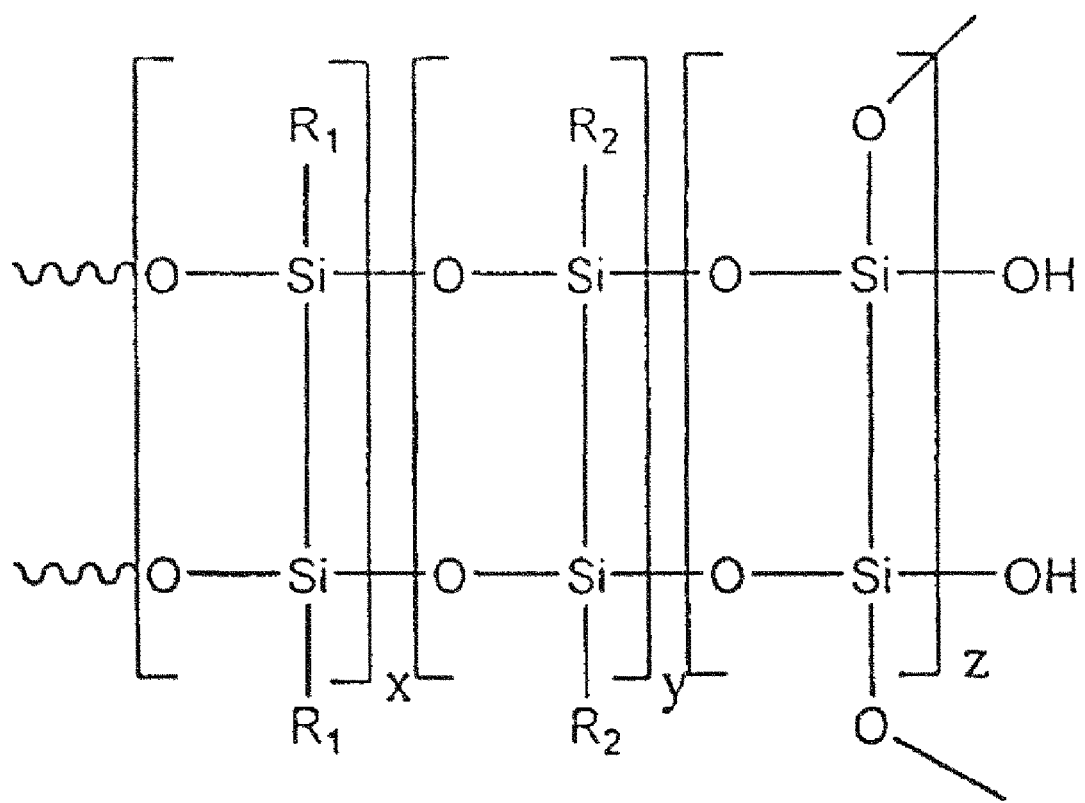
FIG. 1 shows the chemical structure for a silsesquioxane.
Figure 2:
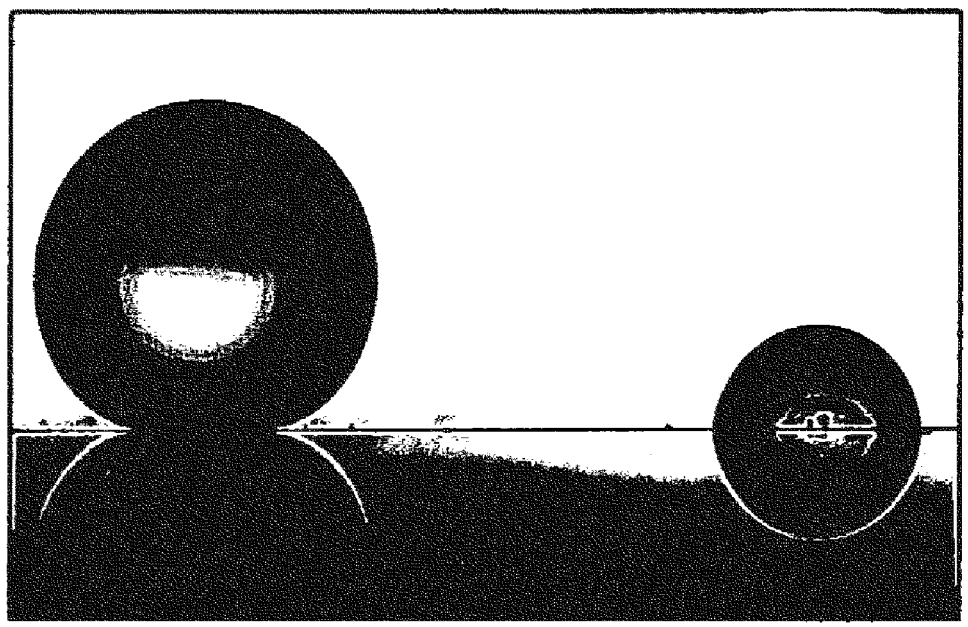
FIG. 2 shows the typical contact angle of coated and uncoated area of a panel.

The present invention provides a coating composition which is super hydrophobic, and when applied on a surface, typically metal, fiberglass, plastic, ceramic, wood, glass, painted material, etc. produces a difficult to wet surface. Contact angles of a liquid such as water on the coated surface should be difficult to measure with conventional means because the water droplet bounces or runs off the surface when applied. The contact angle exceeds 165 degrees and the tilt angle of sliding is less than 2 degrees.

The coatings in the examples are optimized formulations that contain super hydrophobic nanoparticles, for example, a silsesquioxane with an adhesion promoter. Although a variety of nanoparticles will work if coated with a hydrophobic material, e.g., fumed silica and/or titania, perfluoroacrylic resins etc. only few polymers serve as an adequate base for the particles because the surface area of exposed polymer is vastly increased due to very thin film and rough surface area produced by the coating.

The present invention provides a formulation which can utilize nanoparticles in the composition without any binder to produce a practical lotus effect that is not easily destroyed by fog, UV light, or abrasion, or by flowing water.

This transparent, uniform film is stable when exposed outdoors to strong UV light, rain, wind, etc. for a minimum time of one month, compared to 3 days for most other polymers including acrylates, urethane acrylates, homopolymers and copolymers of ethylenically unsaturated monomers, acrylic acid/maleic anhydride copolymers etc. Stability is determined by observing that the super hydrophobic effect has not diminished and by examining the film under the microscope before and after exposure.

The substituted polysiloxane materials used in this invention include those with organic groups having from one to seven carbon atoms such that the substituted polysiloxanes have lower alkyls that provide an average of 0.3 to 1.5, preferably 0.5 to 1.3, carbon atoms per silicon atom. Aqueous dispersions of lower alkyl substituted polysiloxanes of this invention can be prepared by hydrolysis of the corresponding alkyl substituted silanes by conventional methods.

In at least some preferred embodiments the substituted polysiloxane material is a polysilsesquioxane. Useful silsesquioxanes include (a) compounds having repeating units of the formula (RSiO[3/2]) where R is a substituent comprising a single alkyl or aryl group or mixtures of alkyl or aryl groups of carbon atoms, and/or (b) condensates of hydrolsylates of the formula R[x]Si(OR')[y] where x+y is 4 and x is from 0 to 2 and y is from 2 to 4; R is a single alkyl or aryl group or mixture of alkyl or aryl groups comprising up to 7 carbon atoms, optionally substituted with halogen atoms, mercapto groups, and/or epoxy groups; and R' is an alkyl radical with 1 to 4 carbon atoms.

Useful silsesquioxanes are described in U.S. Pat. Nos. 3,493,424, 4,351,736 and 4,781,844, each incorporated herein by reference in its entirety. The silsesquioxane materials can be any of the types described in U.S. Pat. No. 4,781,844 (Kortmann, et al), U.S. Pat. No. 4,351,736 (Steinberger et al.), U.S. Pat. No. 5,073,442 (Knowlton et al.) or U.S. Pat. No. 3,493,424 (Mohrlok et al,), each of which are incorporated herein by reference in its entirety.

As set forth in U.S. Pat. No. 6,723,438, the silsesquioxanes may be prepared by adding silanes to a mixture of water, a buffer, a surface active agent and optionally an organic solvent, while agitating the mixture under acidic or basic conditions. It is preferable to add the quantity of silane uniformly and slowly in order to achieve particles having an average size in the range of 300 to 1500 Angstroms. The exact amount of silane that can be added depends on the substituent R and whether an anionic, non-ionic, or cationic surface active agent is used. Examples of preferred surfactants include long chain alkyl ether sulfates which do not impart significant coloration. Some surfactants have been observed to result in yellowing of the resultant coating.

More particularly, as best illustrated in FIG. 1, the preferred embodiment is shown where $R_1$ groups containing a component comprising an alkyl, aryl groups bonded directly to an Si atom of the silsesquioxane structure. The alkyl groups are preferably with carbon atom $C_1$ to $C_{20}$ and up to $C_{30}$, which may or may not having an additional moiety bonded thereto. The additional moiety is preferably hydroxyl group, $CF_3$, perfluoro groups. Aryl groups substitute phenyl and benzyl groups. $R_2$ groups containing a component comprising substituted alkyl group. The substituted groups are adhesion promoter and cross linking groups such as hydroxyl, amino, epoxy groups.

The following silanes are useful in preparing the polysiloxanes of the present invention: methyltrimethaxysilane, methyltriethoxysilane, methyl triisopropoxyoxysilane, ethyltrimethoxysilane, ethyltriethoxysilane, propyltrimethoxysilane, isobutyltrimethoxysilane, isobutyltriethoxysilane, 2-ethylbutyltriethoxysilane, tetraethoxysilane, mercaptopropyltrimethoxysilane, and 2-ethyl butoxytriethoxysilane fluoroalkylriethaoxysilane, hexadecyl troethoxysilane.

The nanoparticles composed of silsesquioxanes have a particle size ranging from about 7 to 600 nanometers.

To make the hydrophobic silsesquioxane coating easier to apply it can be dispersed in solvents, preferably alcohol, acetone and/or aliphatic hydrocarbons and/or other VOC complaint solvents to make it sprayable.

The solvent may also be selected from the group consisting of an alcohol, a hydrocarbon, mineral spirits, and water. A preferred method of application is by diluting the solvent an aerosol containing a propellant such as carbon dioxide, a hydrocarbon (for example mixtures of propane isobutane), a fluorocarbon, difloroethane, and compressed air. One preferred hydrocarbon is a propane/isobutane.

A preferred embodiment of the present invention provides a coating composition for generating transparent super-hydrophobic surfaces, comprising silsesquioxanes with i) an adhesion promoter, ii) low surface energy groups and to a process for producing such surfaces. For example, one preferred adhesion promoter comprises a urethane polymer.

The coating utilizes hydrophobic nanoparticles of silsesquioxanes in a solvent. A transparent coating (Haziness <1%) can be produced using the current silsesquioxane and adhesion promoter composition whereas previous coatings of comparable hydrophobicity have all been white or opaque. The coating can be applied by a single and easy spraying method and the super hydrophobic property can be achieved by drying the film at room temperature for 5 to 10 minutes. A preferred coating has good resistance to UV light and some resistance to abrasion.

Three (3) grams of silsesquioxane is dispersed in 97 grams of alcohol and mixed for 5 min. 0.1 grams of an adhesion promoter, for example, urethane polymer is added to the silsesquioxanes/alcohol dispersion and mixed for about 5 min. The whole mixture was sonicated for 5-50 seconds to generate uniform particle size.

Preferred adhesion promoters include urethane, polyurethane, acrylic polymers, siloxane, nitrogen containing materials, polyamides, carboxylic containing groups, polyamides with nitrogen groups and the like.

Other adhesion promoter groups applicable to the present composition include copolymers of (meth)acrylic acid with alkyl(meth)acrylates, alkenyl(meth)acrylates, aryl(meth)acrylates, alkylaryl(meth)acrylates, (meth)acrylonitrile or the like; terpolymers of (meth)acrylic acid with alkyl(meth)acrylates, alkenyl(meth)acrylates, aryl(meth)acrylates, alkylaryl(meth)acrylates, (meth)acrylonitrile, styrene and optionally substituted styrenes, vinyl acetate or the like; tetra or pentapolymers of (meth)acrylic acid with alkyl(meth)acrylates, alkenyl(meth)acrylates, aryl(meth)acrylales, alkylaryl (meth)acrylates, (meth)acrylonitrile, styrene and optionally substituted styrenes, vinyl acetate or the like; copolymers of vinylacetic acid with alkyl(meth)acrylates and/or alkenyl (meth)acrylates; products of esterification of polymers containing hydroxyl groups with anhydrides of di- or polycarboxylic acids such as copolymers of hydroxyalkyl(meth) acrylates with (meth)acrylic acid, alkyl(meth)acrylates, alkenyl(meth)acrylates, aryl(meth)acrylates, alkylaryl(meth) acrylates, (meth)acrylonitrile, styrene and optionally substituted styrenes, vinyl acetate or the like; and products of esterification of polymers containing hydroxyl groups with acid chlorides such as copolymers of hydroxyalkyl(meth)acrylates with (meth)acrylic acid, alkyl(meth)acrylates, alkenyl (meth)acrylates, aryl(meth)acrylates, alkylaryl(meth)acrylates, (meth)acrylonitrile, styrene and optionally substituted styrenes, vinyl acetate or the like.

Other polymeric adhesion promoters which may be used are polyalkyl(meth)acrylates in which the alkyl group is, for example, methyl, ethyl, isopropyl, n-propyl, isobutyl, n-butyl, n-hexyl, 2-ethylhexyl, and the like, and binders are those which are insoluble in water, soluble in organic solvents, and partially soluble or swellable in aqueous alkaline solutions. Adhesion promoters which contain hydroxyalkyl(meth)acrylates are very useful when further esterified with anhydrides such as crotonic anhydride, maleic anhydride, itaconic anhydride, and the like, and when esterified with acid chlorides such as acryloyl chloride, methacryloyl chloride, cinnamoyl chloride, and the like. The polymers described above are particularly useful when the molecular weight is between 1000 and 300,000, more preferred between 5,000 and 200,000 and most preferred between 10,000 and 120,000. It is preferred that the acid number is between 5 and 300, more preferred between 10 and 250 and most preferred between 25 and 175.

EXAMPLES

The following examples provide formulations of compositions in accordance with the present invention and provide examples of the range of ingredient percentages by weight providing an effective amount of the particular ingredients deemed necessary to obtain the desired results in single application.

One preferred formula for the wax composition of the present invention is set forth in Example 1 as follows:

Example 1

Synthesis of Silsesquioxanes A1: In a typical experiment, 3 g of 28% ammonium hydroxide was dissolved in 30 g of ethanol and transferred into a 2 necked 100 ml round bottomed flask. The whole mixture was heated to 75° C. for 30 minutes under stiffing. After 30 minutes, a known amount of fluorinated triethoxysilane, methyl triethoxysilane and tetraethylorthosilicate (TEOS) in the ratio of 5/50/45 respectively were added. Continued the reaction for another 12 hrs at 75° C. and cooled the reaction.

Example 2

A2 In another experiment, the experimental procedure follows the same as in example 1 except that the composition of the monomers (fluorinated triethoxysilane, methyl triethoxysilane and Tetraethylorthosilicate (TEOS)) were changed to 0/50/50.

Example 3

A3 In another experiment, the experimental procedure follows the same as in example 1 except that the composition of the monomers (fluorinated triethoxysilane, methyl triethoxysilane and Tetraethylorthosilicate (TEOS)) were changed to 02/48/50.

Example 4

A4 In another experiment, the experimental procedure follows the same as in example 1 except that the composition of the monomers (fluorinated tri ethoxysilane, methyl triethoxysilane and Tetraethylorthosilicate (TEOS)) were changed to 10/40/50.

Example 5

A5 In another experiment, the experimental procedure follows the same as in example 1 except that the composition of the monomers (fluorinated triethoxysilane, methyl triethoxysilane and Tetraethylorthosilicate (TEOS)) were changed to 20/30/50.

Example 6

A6 In another experiment, the experimental procedure follows the same as in example 1 except that the composition of the monomers (fluorinated triethoxysilane, methyl triethoxysilane and Tetraethylorthosilicate (TEOS)) were changed to 50/20/30.

Example 7

A7 In another experiment, the experimental procedure follows the same as in example 1 except that the composition of the monomers (fluorinated triethoxysilane, methyl triethoxysilane and Tetraethylorthosilicate (TEOS)) were changed to 80/10/10.

The compositions and the monomers choice were not limited to the monomers shown in examples. Any substituted trialkoxy silanes shown in FIG. 1 can be utilized to synthesis silsesquioxanes.

Example 8

Coating Composition, B1: 0.5 g of A1 was dispersed in 10 g of isopropyl alcohol and sonicated the whole mixture and applied to a painted surface by aerosol coating method. The transparent, semi permanent coating showed contact angle of 168 degrees.

Example 9

B2: 0.5 g of A2 was dispersed in 10 g of isopropyl alcohol and sonicated the whole mixture and applied to a painted surface by aerosol coating method. The semi permanent coating showed contact angle of 157 degree, however the transparency was lost completely.

Example 10

B3: 0.5 g of A3 was dispersed in 10 g of isopropyl alcohol and sonicated the whole mixture and applied to a painted surface by aerosol coating method. The transparent, semi permanent coating showed contact angle of 172 degree.

Example 11

B4: 0.5 g of A4 was dispersed in 10 g of isopropyl alcohol and sonicated the whole mixture and applied to a painted surface by aerosol coating method. The transparent, semi permanent coating showed contact angle of 168 degree.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

What is claimed is:

1. A coating on a surface, said coating imparting temporary hydrophobic characteristics to said surface, said coating having a contact angle of at least 165 degrees with water, wherein the coating is formed by:
    applying nanoparticles of a fluorinated silsesquioxane having a particle size in the range of about 7 nm to about 600 nm dispersed in a solvent to a surface, said silsesquioxane having pendant groups $R_1$ and $R_2$ being bonded directly to silicon, $R_1$ comprising an alkyl group or an aryl group and $R_2$ comprising an alkyl group substituted with one of an adhesion promoter group or a cross linking group; and
    allowing said solvent to evaporate, said solvent being selected from the group consisting of hydrocarbons, alcohols, mineral spirits, and mixtures thereof.

2. The coating of claim 1, wherein the surface is metal, plastic, wood, glass, or ceramic.

3. The coating of claim 1, wherein the surface is painted or waxed prior to applying said nanoparticles dispersed in said solvent.

4. The coating of claim 1, wherein said adhesion promoter comprises a urethane polymer.

5. The coating of claim 1, wherein said nanoparticles adhere to the substrate in the absence of a binder.

6. The coating of claim 1, wherein said silsesquioxane includes silicon-silicon bonding.

* * * * *